United States Patent
Nakajima (10) Patent No.: US 8,879,133 B2
(45) Date of Patent: Nov. 4, 2014

(54) MULTI-BEAM LIGHT SOURCE DEVICE, OPTICAL SCANNING DEVICE, AND IMAGE FORMING APPARATUS

(75) Inventor: Tomohiro Nakajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 275 days.

(21) Appl. No.: 13/447,409

(22) Filed: Apr. 16, 2012

(65) Prior Publication Data

US 2012/0293849 A1 Nov. 22, 2012

(30) Foreign Application Priority Data

May 16, 2011 (JP) ................. 2011-109588

(51) Int. Cl.
*G02B 26/08* (2006.01)
*G02B 26/12* (2006.01)
(52) U.S. Cl.
CPC ............ *G02B 26/123* (2013.01); *G02B 26/127* (2013.01)
USPC ...................................... 359/204.1
(58) Field of Classification Search
CPC ..... G02B 26/123; G02B 26/125; B41J 2/472; H04N 1/1135
USPC .......................................... 359/204.1–204.5
See application file for complete search history.

(56) References Cited

U.S. PATENT DOCUMENTS

| | | | |
|---|---|---|---|
| 7,511,868 B2 | 3/2009 | Nakajima | |
| 7,561,318 B2 | 7/2009 | Nakajima | |
| 7,710,445 B2 | 5/2010 | Amada et al. | |
| 7,924,491 B2 | 4/2011 | Nakajima | |
| 7,936,492 B2 | 5/2011 | Amada et al. | |
| 7,956,882 B2 | 6/2011 | Nakajima | |
| 2002/0171878 A1* | 11/2002 | Nakajima | 358/505 |
| 2010/0183337 A1 | 7/2010 | Kubo et al. | |
| 2010/0194843 A1* | 8/2010 | Sakai et al. | 347/243 |

FOREIGN PATENT DOCUMENTS

| | | |
|---|---|---|
| JP | 2002-341273 | 11/2002 |
| JP | 2003-211728 | 7/2003 |
| JP | 2007-79295 | 3/2007 |
| JP | 2009-194151 | 8/2009 |

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

A multi-beam light source device includes a vertical cavity surface emitting laser device having monolithically fabricated multiple light sources; an optical sensor to monitor an output of beams of light emitted from the vertical cavity surface emitting laser; a printed circuit board on which a driving circuit is formed to drive the vertical cavity surface emitting laser device based on monitoring signals from the optical sensor; a coupling lens to change the beams of light emitted from the vertical cavity surface emitting laser device to a predetermined state; a transparent board on which a wiring pattern is formed to wire an electrode of the vertical cavity surface emitting laser device and a terminal of the driving circuit; and a holding unit to integrally hold the vertical cavity surface emitting laser device, the optical sensor, the printed circuit board, the coupling device, and the transparent board.

9 Claims, 9 Drawing Sheets

MULTI-BEAM LIGHT SOURCE DEVICE, OPTICAL SCANNING DEVICE, AND IMAGE FORMING APPARATUS

CROSS-REFERENCE TO RELATED APPLICATION

This patent application is based on and claims priority pursuant to 35 U.S.C. §119 to Japanese Patent Application No. 2011-109588, filed on May 16, 2011, the entire disclosure of which is hereby incorporated by reference herein.

BACKGROUND OF THE INVENTION

Field of the Invention

In color image forming apparatuses employing a tandem system described in, for example, Japanese Patent Application Publication No. 2002-341273 (JP-2002-341273-A), image bearing drums (photoreceptor drums) corresponding to respective colors are arranged in the transfer direction of a recording (transfer) medium and bear toner images formed at image forming stations for each of the respective colors that are superimposed to form a color image at each pass of the recording medium (that is, every time the transfer medium passes through the image formation stations). The net result is an increase in the color image forming speed.

At the same time, in an attempt to improve the speed of the performance of optical scanning devices used in such image forming apparatuses, scanning devices employing a multi-beam system are proposed.

Such a multi-beam scanning device scans a target with multiple beams in a single shot and records multiple adjacent lines at the same time, thereby speeding up image formation without increasing the rotation speed of the polygon scanner serving as a deflection device.

JP-2003-211728-A describes a system for forming multiple lines at the same time by scanning a target in a single shot with a vertical cavity surface emitting laser device (VCSEL). Using a VCSEL allows the number of light sources to be increased to several tens of beams. Therefore, the recording density on an image bearing member (photoreceptor) is improved, resulting in printing-like high-definition image recording without increasing the rotation speed of the polygon motor.

Figure 9:
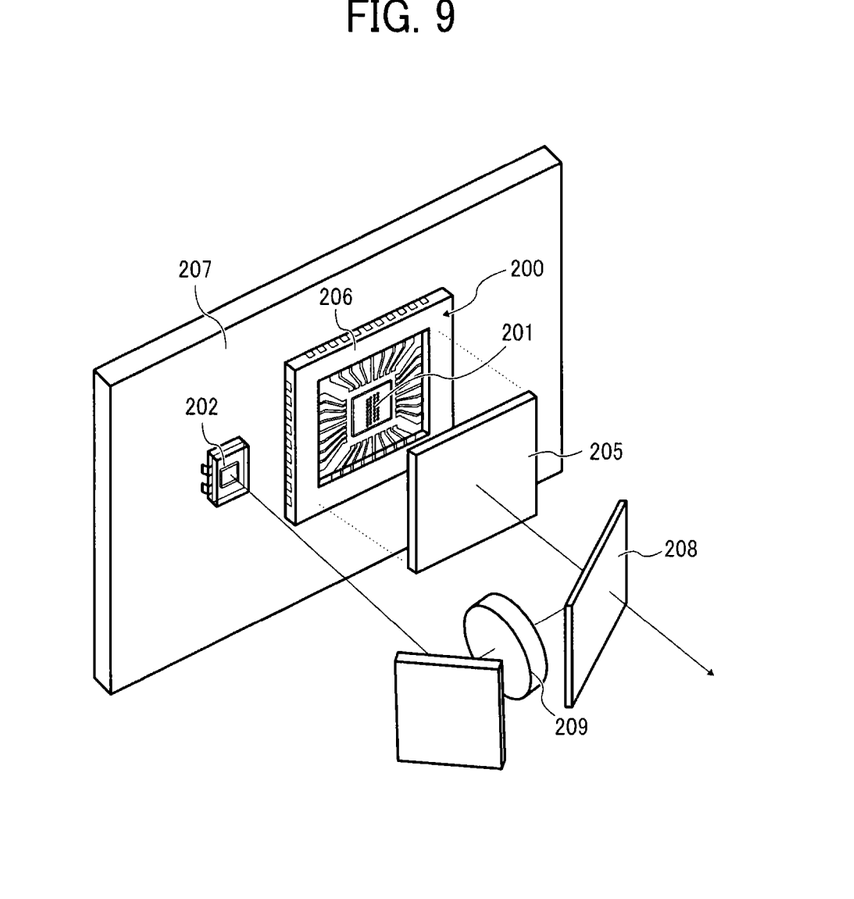
FIG. 9 is a perspective view illustrating a typical mounting position relationship between a vertical cavity surface emitting laser device and a transparent board.

As illustrated in FIG. 9, such a VCSEL 200 has a two-dimensionally and monolithically fabricated vertical cavity surface emitting semiconductor laser array chip 201 attached to a flat package 206 having a box form in which lead terminals are radially arranged. The rear side of the vertical cavity surface emitting semiconductor laser array chip 201 is attached to the floor of a concave portion formed in the flat package 206 while the emitting surface of the chip 201 faces outward toward the front side of the flat package 206. The electrodes of the individual light sources are wire-bonded to the lead terminals. The vertical cavity surface emitting laser device 200 is sealed with a glass pane 205 to protect the light sources from dust and oxidization. The rear side of the flat package 206 is brought into contact with a printed circuit board 207 in the same manner as other typical electronic components and the lead terminals exposed to the lateral side is soldered to the printed circuit board 207.

JP-2007-79295-A describes an example of a structure in which a VCSEL and an optical sensor are mounted on the same printed circuit board. Beams of light from the VCSEL are split, one of which is guided onto the optical sensor to monitor the output.

FIG. 9 illustrates a typical example of a surface-mounted optical sensor. An optical sensor 202 that monitors the optical beams output from the VCSEL contains a PD sensor chip sealed in a resin package in which lead terminals are arranged and is mounted on the printed circuit board 207 by soldering the terminals.

The beams of light from the VCSEL 200 are split into light paths by a half mirror 208, etc. and part of the beams of light is reflected at the half mirror 208 and guided to the optical sensor 202 via a collecting lens 209 to correct the light path displacement so as to securely direct the beams of light from each light source onto the optical sensor 202 to permit detection of the amount of light. The output of the beams of light that have passed through the half mirror 208 is controlled to maintain the irradiation light amount on a scanned image bearing member at a constant level.

In recent years, electrophotographic color image forming apparatuses have begun to gain acceptance in the quick-printing field as viable on-demand printing systems and therefore are required to produce high-definition images at a high speed, which is enabled by using a VCSEL.

Typically, since VCSELs are accommodated in a flat package and the electrodes are wired for each light source, there is an increase in cost. In addition, since the mounting surface of the VCSEL is the other side of the light emitting surface thereof, the emitting direction of the beams of light from the VCSEL varies significantly depending on manufacturing tolerances of the mounting surface. Therefore, with a coupling lens that changes the beams of light to a predetermined state, e.g., collimates the beams of light, to deal with eccentricity of the incident position of the beams of light to the optical axis it is necessary to enlarge the aperture and elongate the focal length, resulting in a size increase of the multi-beam light source, which is undesirable.

JP-2009-194151-A describes a VCSEL which a vertical cavity surface emitting semiconductor laser array chip is mounted on a glass board having wiring patterns formed thereon. A package is not required by directly mounting a vertical cavity surface emitting semiconductor laser array chip on a glass board. In a typical light source unit, the outside wall surface of a flat package is pressed against the holding unit that holds the coupling lens to determine the position.

Since the glass board has low rigidity and the cut surface thereof is not finely finished, the position of the coupling lens when a package is not required is not determined in the same manner as when a package is required. Therefore, reliably maintaining the positioning accuracy of the coupling lens and the VCSEL is a problem left unsolved.

Furthermore, with regard to an optical sensor to detect beams of light from the VCSEL, since the arrangement of the light sources of the VCSEL and the posture of the optical sensor and the relative positions of both vary when mounting them on a printed circuit board, the deviation in the amount of light detected by the optical sensor increases among the light sources, which leads to deterioration of the accuracy of auto power control (APC) to maintain a constant output. This is a barrier to stable image density The present invention relates to optical polymerizable inkjet ink, an ink cartridge that accommodates the ink, and a printer in which the ink cartridge is installed.

SUMMARY OF THE INVENTION

In view of the foregoing, the present invention provides a multi-beam light source device including a vertical cavity surface emitting laser device having monolithically fabricated multiple light sources, an optical sensor to monitor an output of beams of light emitted from the vertical cavity surface emitting laser, a printed circuit board on which a driving circuit is formed to drive the vertical cavity surface emitting laser device based on monitoring signals from the optical sensor, a coupling lens to change the beams of light emitted from the vertical cavity surface emitting laser device to a predetermined state, a transparent board on which a wiring pattern is formed to wire an electrode of the vertical cavity surface emitting laser device and a terminal of the driving circuit, and a holding unit to integrally hold the vertical cavity surface emitting laser device, the optical sensor, the printed circuit board, the coupling device, and the transparent board, wherein the vertical cavity surface emitting laser device is mounted to the transparent board with an emitting surface of the vertical cavity surface emitting laser device in contact with a surface of the transparent board on which the wiring pattern is formed, the transparent board is mounted on the printed circuit board with the surface on which the wiring pattern of the transparent board is formed in contact with the printed circuit board, and the printed circuit board is supported by the holding unit with a surface of the printed circuit board on which the transparent board is mounted pressed against and supported by a mounting surface formed on the holding unit which is orthogonal to an optical axis of the coupling lens.

As another aspect of the present invention, an optical scanning device is provided which includes the multi-beam light source device mentioned above, a deflector to scan the beams of light from the multi-beam light source device, and an image focusing optical system to focus images on the surface scanned by the beams of light.

As another aspect of the present invention, an image forming apparatus is provided which includes the optical scanning device mentioned above.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings, in which like reference characters designate corresponding parts throughout and wherein.

DETAILED DESCRIPTION OF THE INVENTION

Embodiments of the present disclosure are described with reference to the accompanying drawings.

Figure 1:
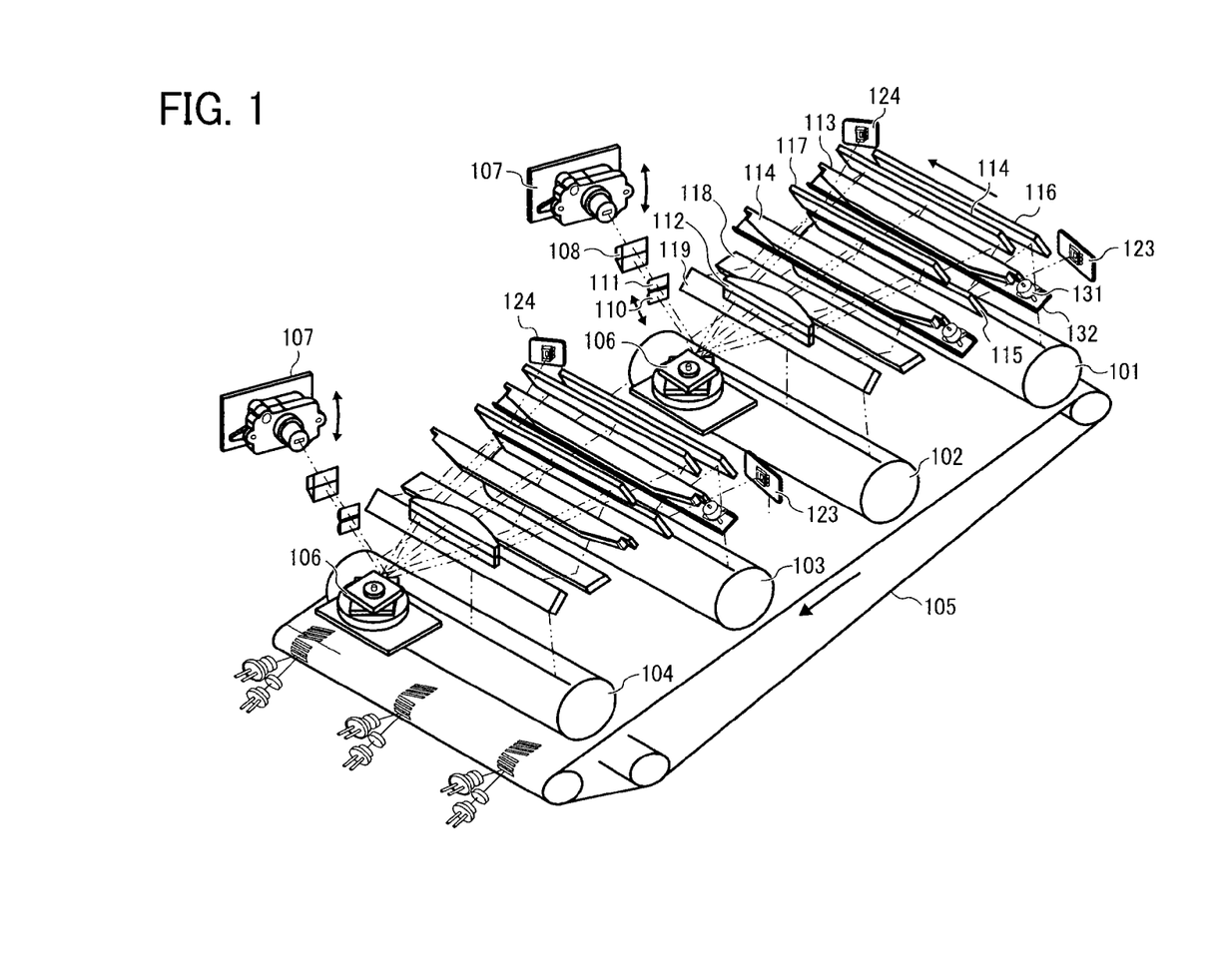
FIG. 1 is a perspective view illustrating an embodiment of an optical scanning device according to the present disclosure.

FIG. 1 is an embodiment of an optical scanning device that scans four image forming stations.

The four image forming stations are separated into two units each of which contains two stations. In this optical scanning device, multiple optical beams from each light source unit are deflected in the same direction by a single polygon mirror to scan each photoreceptor drum (image bearing drum).

Four image bearing drums 101, 102, 103, and 104 are arranged along the moving direction of an intermediate transfer belt 105 serving as an intermediate transfer body with an equal gap therebetween and different color toner images are sequentially transferred to and superimposed on the intermediate transfer belt 105 by a primary transfer device to form a color image.

The intermediate transfer belt 105 is rotatably suspended over three supporting rollers.

Figure 8:
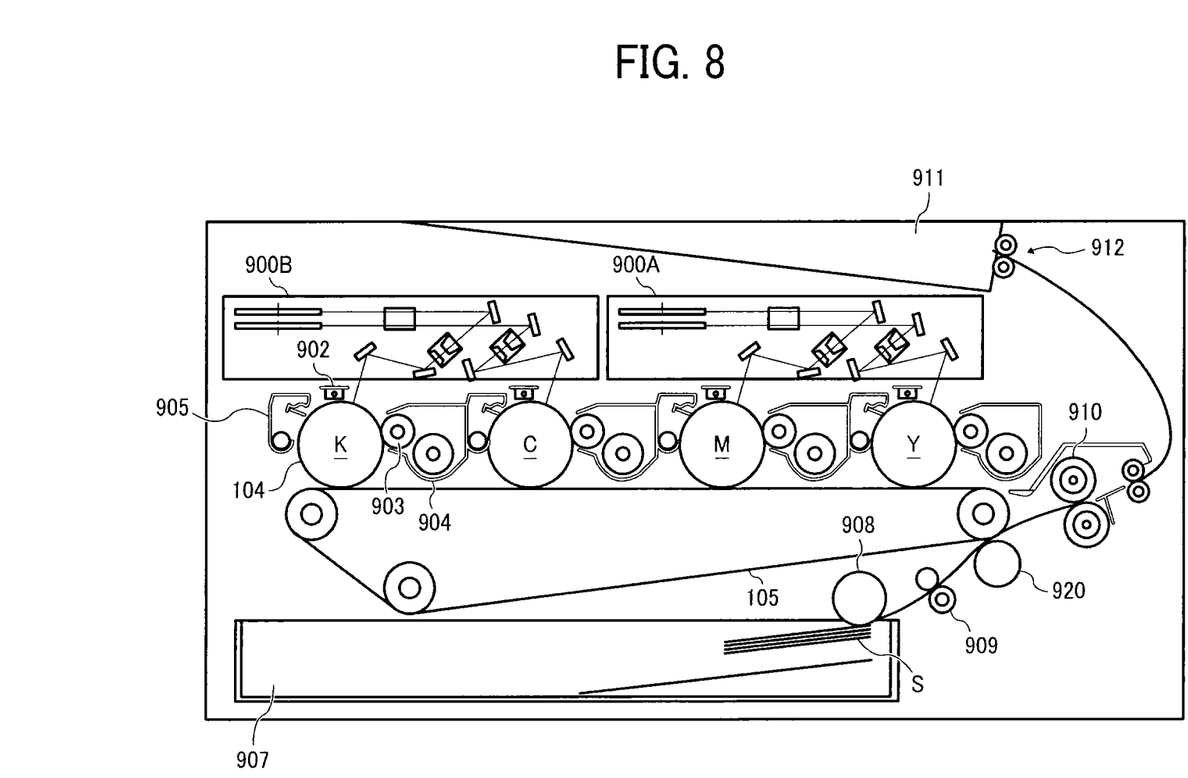
FIG. 8 is a diagram illustrating an image forming apparatus of an embodiment according to the present disclosure.

As illustrated in FIG. 8, the optical scanning device that scans each image bearing drum is formed of two integrally-formed optical scanning devices 900A and 900B and each optical scanning device has two polygon mirrors with the phases shifted from each other relative to the rotation direction thereof to scan each image bearing drum with beams of light. A deflector is formed of the polygon mirror 106, a driving force to rotate the polygon mirror 106, etc.

Since the configuration of the optical scanning devices 900A and 900B are the same, only 900A that scans the image bearing drums 101 and 102 is described below.

A light source unit 107 is provided to the two stations that are scanned simultaneously. Using a beams of light separating prism 108, the beams of light are split for each of the two polygon mirrors 106 having shifted phases from each other relative to the rotation direction described above to alternately form images on each image bearing drum in chronological order according to image data obtained for each station.

Figure 2:
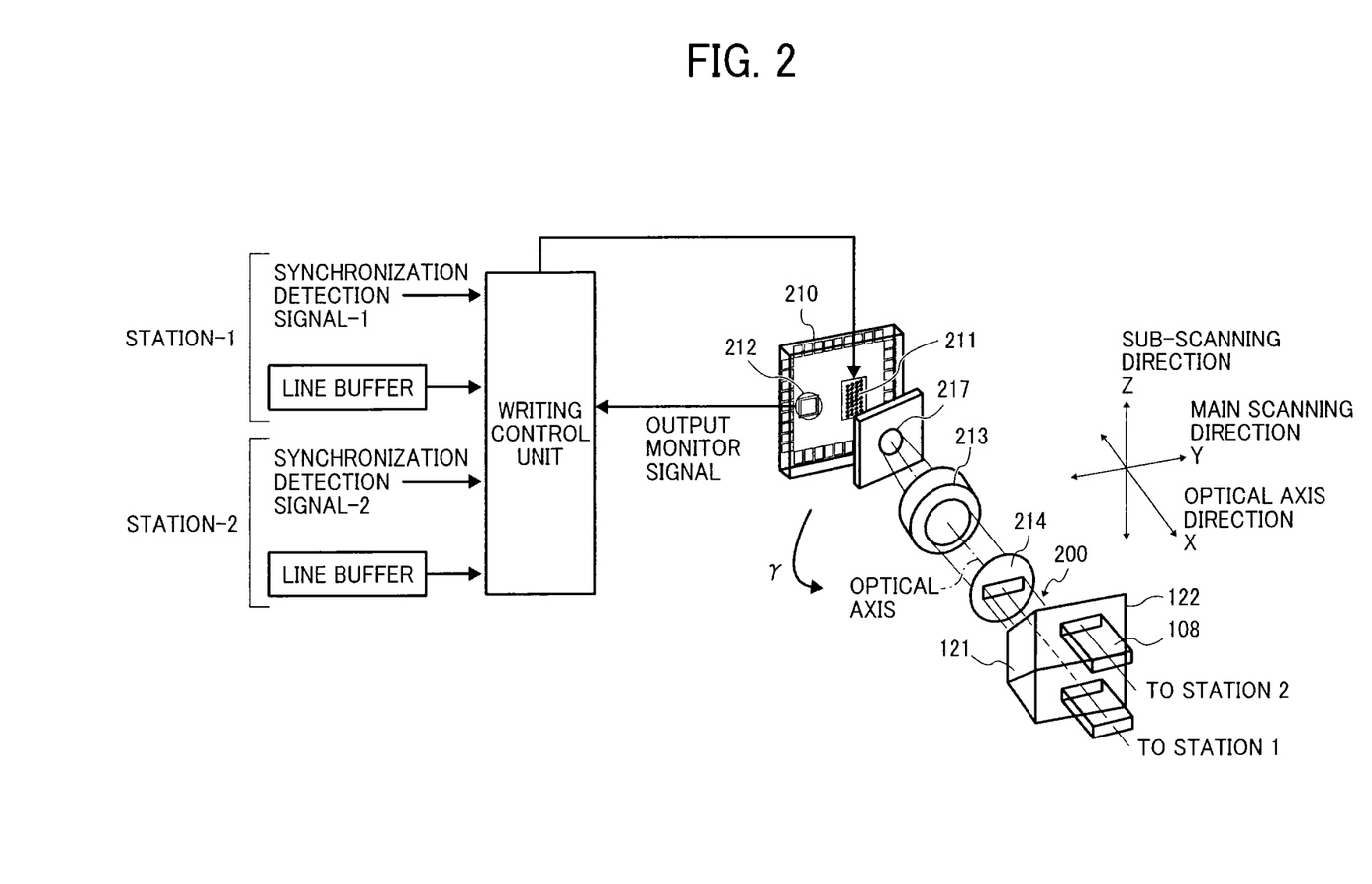
FIG. 2 is a diagram illustrating a main portion and a control configuration of a light source unit.
Figure 5:
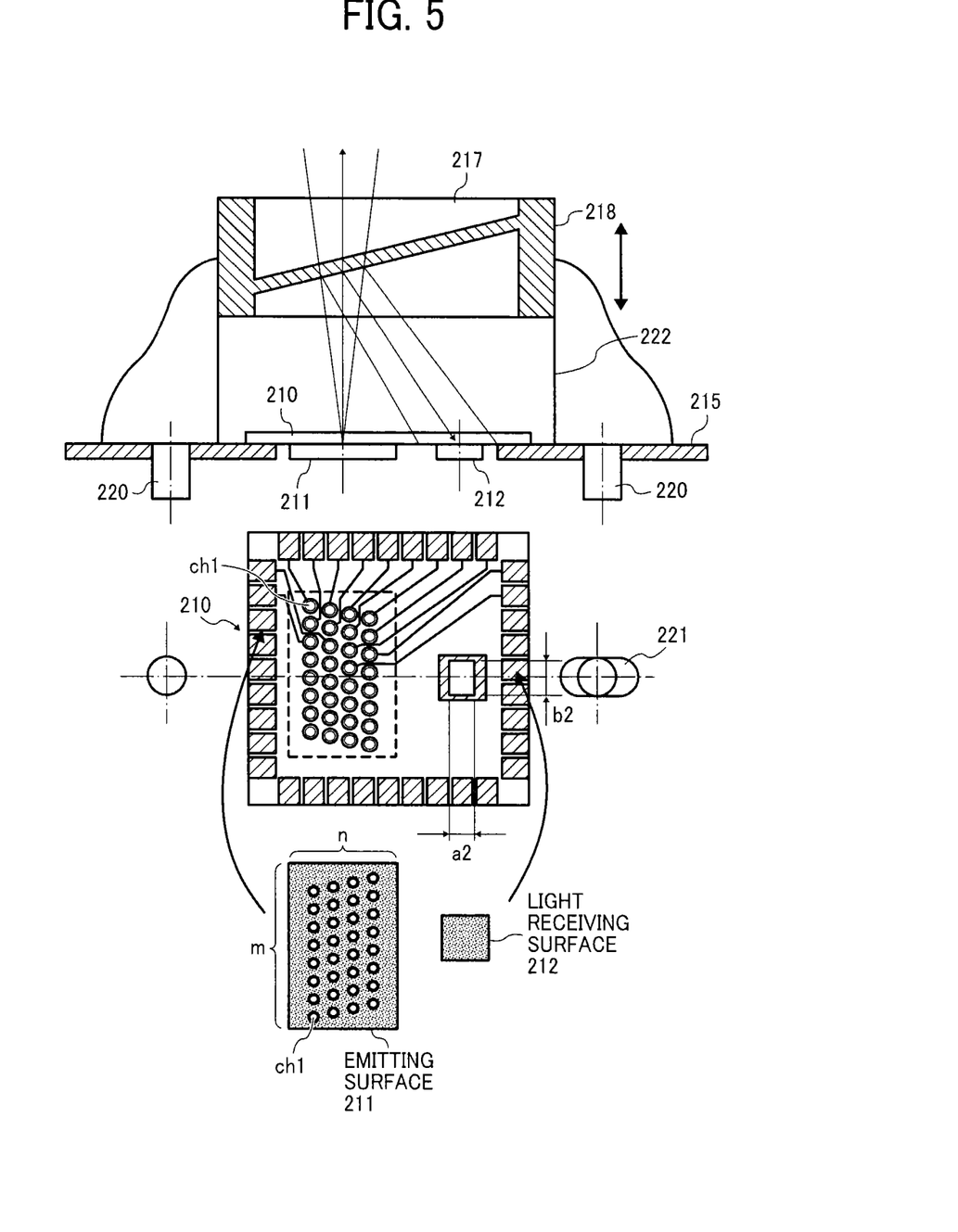
FIG. 5 is an enlarged diagram illustrating an arrangement pattern of the light source of the vertical cavity surface emitting laser device.

As illustrated in FIGS. 2 and 5, the light source unit 107 has a vertical cavity surface emitting semiconductor laser array 211 having m (lines)×n (columns) light sources arranged in matrix in the main scanning direction and the sub-scanning direction with an equal gap therebetween, e.g., two-dimensionally arranged 32 (=8×4) light sources in Examples.

The light sources of the vertical cavity surface emitting semiconductor laser array 211 are arranged in such a manner that the arrangement direction of the light sources in the sub-scanning direction is slanted a predetermined angle relative to the main scanning direction to form a right angle relative to the main scanning direction. The arrangement pitch is set in such a manner that the beam spot from each light source on the image bearing drum serving as the image forming surface is a scanning line pitch p, which corresponds to the recording density so that 32 lines are scanned at the same time.

The beams of light separating prism 108 has a half mirror surface 121 and a mirror surface 122 parallel thereto. A half amount of light of each of beams of light 200 from each light source that have passed through an aperture 214 is reflected at the half mirror surface 121. The rest transmits therethrough and is split to the top and the bottom and emitted in the sub-scanning direction with a predetermined gap after direction alignment.

In this embodiment, this gap is set to be 6 mm, which is equal to the distance between the top and the bottom of the polygon mirror and that of the fθ lens.

As illustrated in FIG. 1, cylinder lenses 110 and 111 are provided for each split beams, have a positive curvature in the sub-scanning direction, and are supported after the positions of the cylinder lenses 110 and 11 are adjusted in the optical axis direction in such a manner that the cylinder lenses 110 and 111 once unspread the beams on the polygon mirror surface and the deflection point and the image bearing drum surface have a conjugation relationship in the sub-scanning direction together with a toroidal lens described later.

The polygon mirror 106 has four planes and deflects multiple beams of light from each luminous point array by the same deflection plane to scan the image bearing drum once. The phases of the two polygon mirrors 106 situated at the top and the bottom are shifted 45° from each other and the polygon mirrors 106 at the top and the bottom alternately scan the image bearing drums with the beams of light.

The image focusing optical system has an fθ lens 112 and toroidal lenses 113 and 114, each of which is formed by plastic molding. The fθ lens 112 has a non-arc form to have a power to move the beams of light in the main scanning direction at a constant speed on the surface of the image bearing drum as the polygon mirror 106 rotates and is integrally laminated to have two layers.

The scanning beams that have passed through the toroidal lens 113 enter into a synchronization detection sensor 123 serving as a synchronization detector arranged on the scanning initiation side and a light detection sensor 124 serving as another synchronization detector arranged on the scanning ending side and time the start of writing for each light source based on the detected synchronization signals of the synchronization detection sensor 123.

The detection signal of the light detection sensor 124 arranged on the scanning ending side is corrected with regard to the magnification in the main scanning direction by measuring the detection time difference of the beams of light from the synchronization detection sensors 123 arranged on the scanning initiation side, comparing the difference with predetermined reference values, and changing the pixel clocks that modulates the light sources Although the light detection sensors are provided to only one station in this Embodiment, they can also be provided to each station.

The light path from the light source to the image bearing drum is described next.

As illustrated in FIG. 2, the light sources of the vertical cavity surface emitting semiconductor laser array 211 are arranged symmetrically relative to the optical axis of a coupling lens 213 and converted into collimated beams of light by the coupling lens 213. Thereafter, as described above, the collimated beams of light are split into two vertically by the beams of light separating prism 108 along the sub-scanning direction and guided into the image bearing drum in each station.

As illustrated in FIG. 1, the beams of light from the multiple light sources emitted from the lower part of the beams of light separating prism 108 are deflected at the lower polygon mirror 106 via the cylinder lens 100 to scan. Thereafter, the beams of light pass through the lower part of the fθ lens 112, enter into the toroidal lens 113 via a reflecting mirror 114, and focus image spots on the image bearing drum 101 via reflecting mirrors 115 and 116 to form latent images corresponding to the image information of yellow as the first image forming station.

The beams of light from the multiple light sources emitted from the upper portion of the beams of light separating prism 108 are deflected at the upper polygon mirror 106 via the cylinder lens 111 and scan. Thereafter, the beams of light pass through the upper part of the fθ lens 112, enter into the toroidal lens 114 via a reflecting mirror 117, and focus image spots on the image bearing drum 102 via reflecting mirrors 118 and 119 to form latent images corresponding to the image information of magenta as the second image forming station.

The fourth image forming station that forms latent images on the image bearing drum 104 according to image information of black and the third image forming station that forms latent images on the image bearing drum 103 according to image information of cyan in the same manner as the first and the second image forming stations.

The toroidal lenses 113 and 114 have rib portions that integrally enclose the lens units and are supported by a support plate 131. The support plate 131 has one end pressed against the leading end of a feed screw threadably mounted to the shaft of a stepping motor 132 and is rotatable around the shaft parallel to the optical axis with the other end as a supporting point (in the same manner as the adjustment as in the γ direction of FIG. 2). The generating line of the toroidal lens in the sub-scanning direction tilts as the shaft rotates, thereby tilting the scanning line as the image focusing position of the toroidal lens to correct the scanning lines on the image bearing member to be parallel between the stations.

Figure 3:
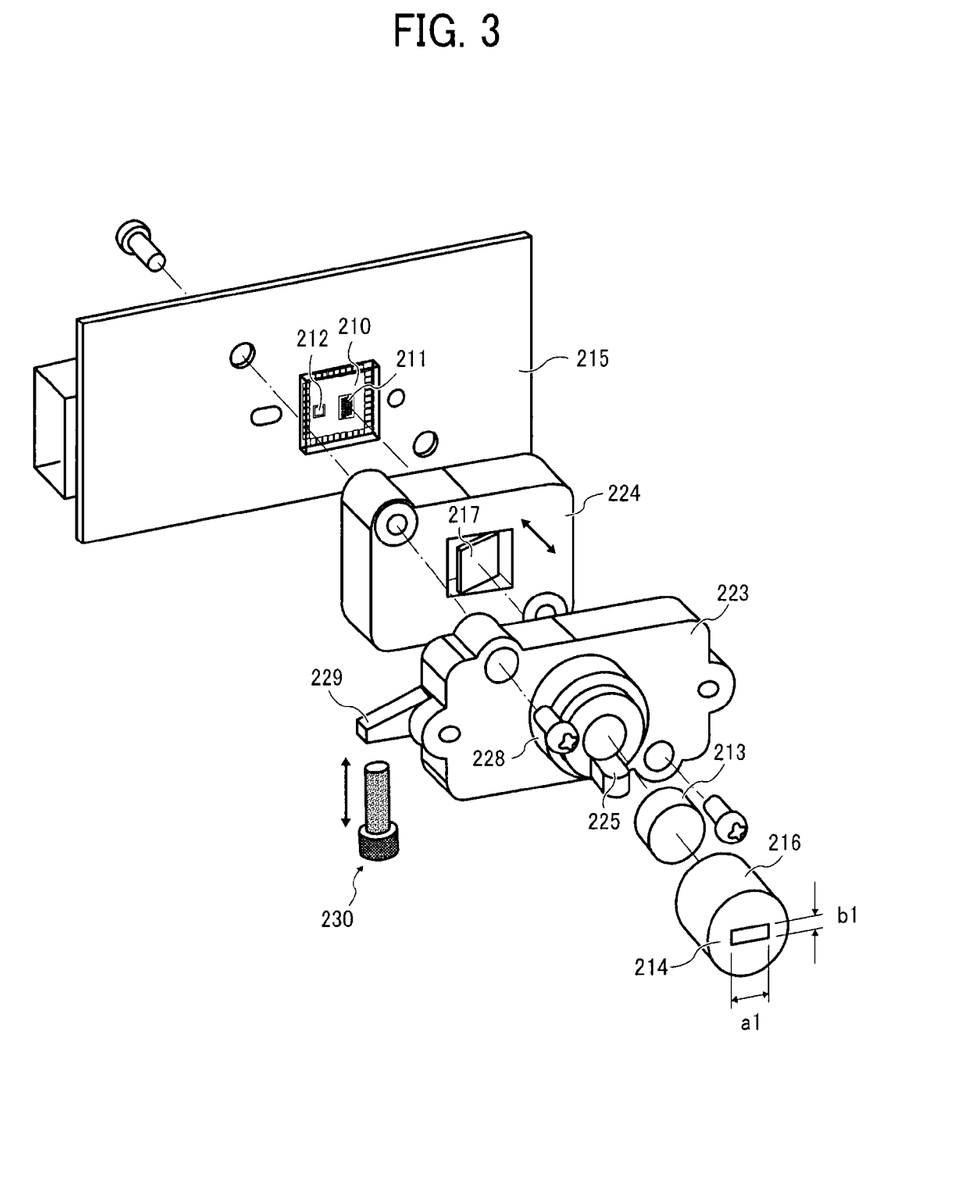
FIG. 3 is an exploded perspective view of the light source unit.
Figure 4:
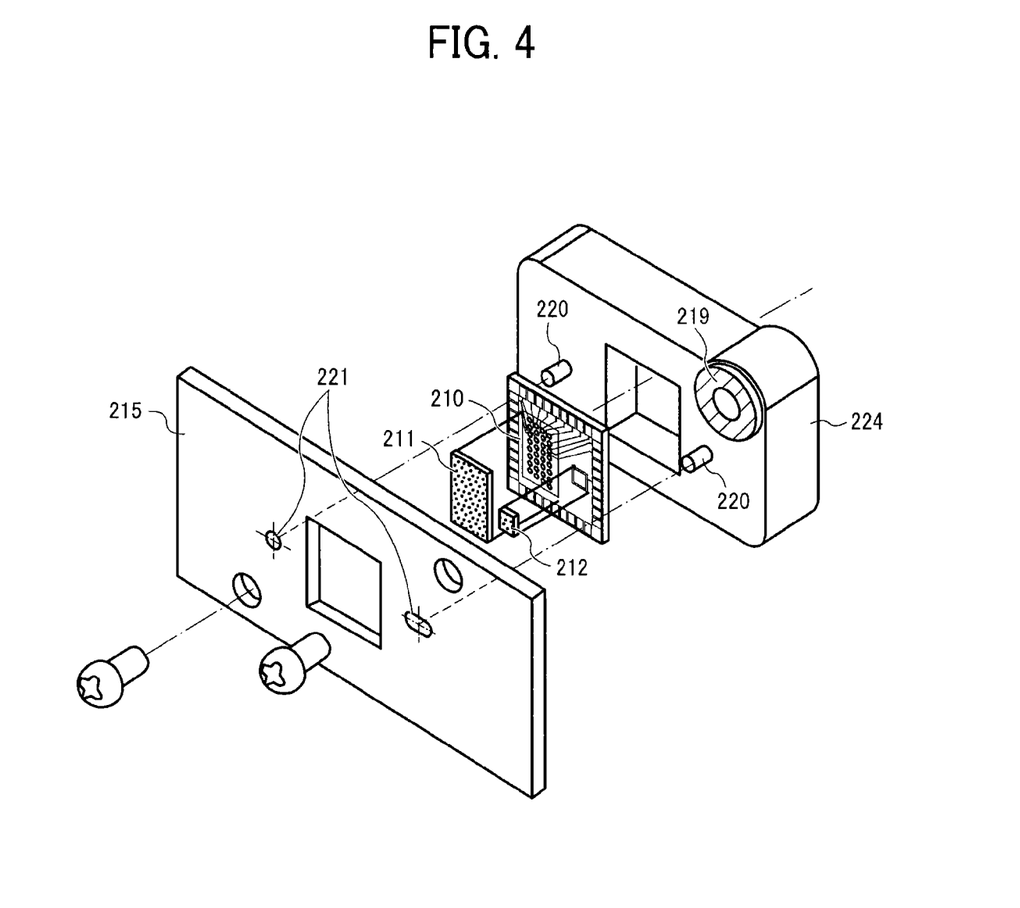
FIG. 4 is a perspective view illustrating a mounting position relationship between a vertical cavity surface emitting laser device and a transparent board.

FIGS. 3, 4, and 5 illustrate the structure of the light source unit 107.

The vertical cavity surface emitting semiconductor laser array chip 211 having a monolithic and two-dimensional fabrication and a PD (photodiode) chip 212 for monitoring as an optical sensor receiving the beams of light from each light source are mounted on a transparent board 210. The transparent board 210 has a wiring pattern to which each light source of the vertical cavity surface emitting semiconductor laser array chip 211, the electrode of the PD chip 212 for monitoring, and the terminals of a driving circuit are wired. Each of the emitting surface of the vertical cavity surface emitting semiconductor laser array chip 212 and the receiving surface of the PD chip 212 for monitoring contact the wiring-pattern formed surface of the transparent substrate 210 upside down.

Therefore, the wiring patterns at the electrode portions of each light source and the PD chip 212 for monitoring have an opening at center with connection at the peripheral portions.

The vertical cavity surface emitting semiconductor laser array chip 211 and the PD chip 212 are arranged along the main scanning direction while the center positions along the sub-scanning direction are aligned.

Furthermore, the wiring pattern formed surface of the transparent board 210 having the structured described above are installed in contact with the substrate surface of a printed circuit board 215 on which a driving circuit to drive each light source of the vertical cavity surface emitting semiconductor laser array chip 211 is formed for circuit connection.

The printed circuit board 215 is fixed by a screw in such a manner that the board surface of the print substrate 215 on which the transparent board 210 is mounted is pressed against a mounting surface 219 that orthogonalizes the optical axis of the coupling lens 213 formed on a base material 224 and a positioning pin (device) 220 positioned on an extended line of the center positions of the vertical cavity surface emitting semiconductor laser array chip 211 and the PD chip 212 for monitoring is engaged with reference and sub-reference holes 221 of the printed circuit board 215.

Each beam of light emitted from each light source of the vertical cavity surface emitting semiconductor laser array chip 211 transmits the transparent board 210 and splits at a half mirror 217 serving as a light path splitting member which is tilted about 10° relative to the main scanning direction. About 10% of the amount of light emitted from the light source are reflected and enter the PD chip 212 for monitoring.

The half mirror 217 is coated with a half mirror film on the side of the light source and the outside wall of a frame portion 218 integrally formed with the half mirror 217 is movable in the optical axis direction along an inner wall 222 of the piercing portion formed on the base material 224. After the entering position of the beams of light is adjusted in such a manner that the deviation of the detected amount of light at the PD chip 212 for monitoring is minimum for the beams of light emitted from each light source of the vertical cavity surface emitting semiconductor laser array chip 211, the half mirror 217 is adhesively fixed.

Since the light sensor is held while maintaining the arrangement accuracy with the vertical cavity surface emitting laser device, the deviation among the beams of light from each light source can be made minimal, thereby producing high definition images without causing uneven image density.

In addition, since the light path splitting member is provided to the holding (supporting) member (holder) so that the light path splitting member can be held while maintaining the arrangement accuracy of the optical sensor and the vertical cavity surface emitting laser device, the deviation among the detected beams of light from each light source can be made minimal, thereby producing high definition images without causing uneven image density.

Furthermore, since the light path splitting member is adjusted in the direction along the optical axis of the coupling lens, the deviation of the detected light amounts among the beams of light which enter the optical sensor from each source light is significantly reduced, thereby producing furthermore high definition images without causing uneven image density.

In this Embodiment, the half mirror is used as the light path splitting member. Other systems can be used such that an opening smaller than beams of light is provided to a reflective mirror to form an aperture mirror that reflects light entering outside the opening and the zero order (transmitted beams) is split from the first order (diffracted beams) using a diffraction surface.

Figure 7:
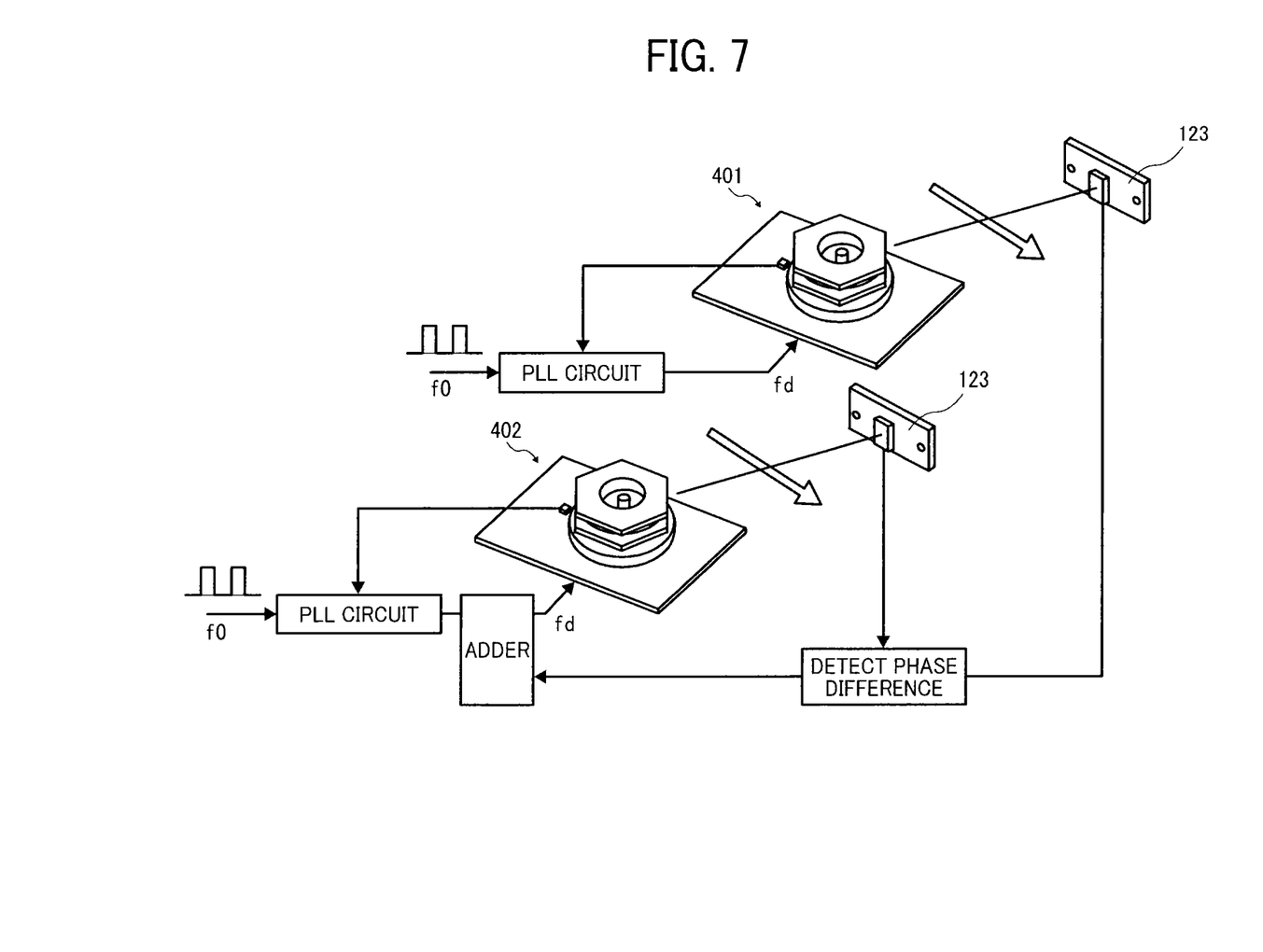
FIG. 7 is a block chart illustrating a configuration of rotation phase control of a polygon mirror in a deflector.

For the time from starting scanning at each surface of the polygon mirror to the beam reaching the image area, each light source is sequentially turned on to the signal (APC=auto power control) illustrated as in FIG. 7 to detect the intensity of each beam by the PD chip 212 for monitoring. After the detected value is compared with a predetermined reference value, the input current is set such that the output of each light source is equal to a predetermined value. Until the next time the beam is detected, the input current is maintained to keep a constant output of the light source.

Multiple beams of light from the vertical cavity surface emitting semiconductor laser array 211 are emitted after these are adjusted such that each light source is symmetrically arranged relative to the optical axis in the plane (yz) that orthogonalizes the optical axis of the coupling lens 213 by the position arrangement in the x, y, and z directions of the coupling lens 213 and the beams of light from each light source are collimated.

The light source unit 107 is integrally configured by screw such that a holder 223 that holds the coupling lens 213 and the base member 224 that holds the printed circuit board 215 on which the vertical cavity surface emitting semiconductor laser array is mounted are jointed at the reference surface that orthogonalizes the optical axis of the coupling lens 213. The base material 224 and the holder 223 form a holding unit.

It is preferable that the base material 224 and the holder 223 have a significantly same heat expansion coefficient. In this embodiment, the holding unit is divided into the two formed of the same material but is not necessarily divided.

There are formed on the printed circuit board 215 a power control circuit that holds the output power of the beams of each light source constantly and a driving circuit that modulates each light source according to obtained image information The coupling lens 213 sets out the vertical cavity surface emitting semiconductor laser array 211 on a cylindrical plane 225 formed on the holder 223 and is fixed by filling an adhesive in the gap with the rim. A cap 216 having an aperture 214 that regulates the beams of light emitted from the light source is mounted to form a light source unit.

The aperture 214 has a rectangular opening coaxially with the optical axis of the coupling lens 213 and when the main scanning width is a1, the sub-scanning width is b1, the main scanning width of the PD chip 212 for monitoring is a2, and the sub-scanning width thereof is b2, the aperture width of the PD chip 212 for monitoring is set to be that a1/b1 is about 5 and a2/b2 or b2/a2 is from 4 to 6 and the aperture width is regulated by the wiring pattern of the transparent board 210.

Therefore, if the amount of beams of light that pass through the aperture of the aperture 214 changes according to the emission angle of the vertical cavity surface emitting semiconductor laser array 211, the aspect ratio of the aperture is arranged in such a manner that the change in the ratio of the amount of light detected by the PD chip 212 for monitoring that receives the beams of light split before the aperture of the aperture 214 to the amount of light of the beams of light that passes through the aperture of the aperture 214 is constantly within from −20% to 20%.

The aperture can be set without an adverse impact on the arrangement accuracy between the optical sensor and the multiple light sources, thereby improving the control accuracy of the amount of light that reaches the scanning surface.

Since the emission angle changes isotropically in the main scanning and sub-scanning direction, the directions of the long side does not necessarily match that of the short side, both a2/b2 and b2/a2 are suitable.

In addition, although the aperture is of a rectangular form in this embodiment, the results are the same if it is an ellipse or oval form.

Since the aspect ratio of the aperture that regulates the beams of light emitted from the coupling lens is set to be significantly the same as that of the receiving surface of the optical sensor, the optical sensor accurately detects the beams of light even when the emission angle of the vertical cavity surface emitting laser device varies, thereby improving the control accuracy of the amount of light that reaches the scanned surface.

In the light source unit 107, a cylinder portion 228, that is brought into contact in a plane perpendicular to the optical axis and arranged coaxially with the optical axis is fitted in and rotatably supported by a housing that supports the polygon scanner (i.e., deflector) and the image focusing optical system.

The holder unit 223 has an arm 229 against which an adjustment screw 230 is pressed to rotate the whole of the light source unit 107 γ times by adjusting the amount of screwing the adjustment screw 230, thereby adjusting the posture of the vertical cavity surface emitting semiconductor laser array 211 in the arrangement direction. Therefore, even when there is a posture misalignment of the vertical cavity surface emitting semiconductor laser array 211 on the printed circuit board 215, the light source unit 107 can be assembled so as to orthogonalize the beam spot from each light source on the image bearing surface in the sub-scanning direction with the main scanning direction, thereby equalizing the scanning line pitch.

In this embodiment, as described above, since the PD chip 212 for monitoring is integrally configured, the relative position of the vertical cavity surface emitting semiconductor laser array 211 and the PD chip 212 for monitoring is still maintained even after the adjustment described above.

Figure 6:
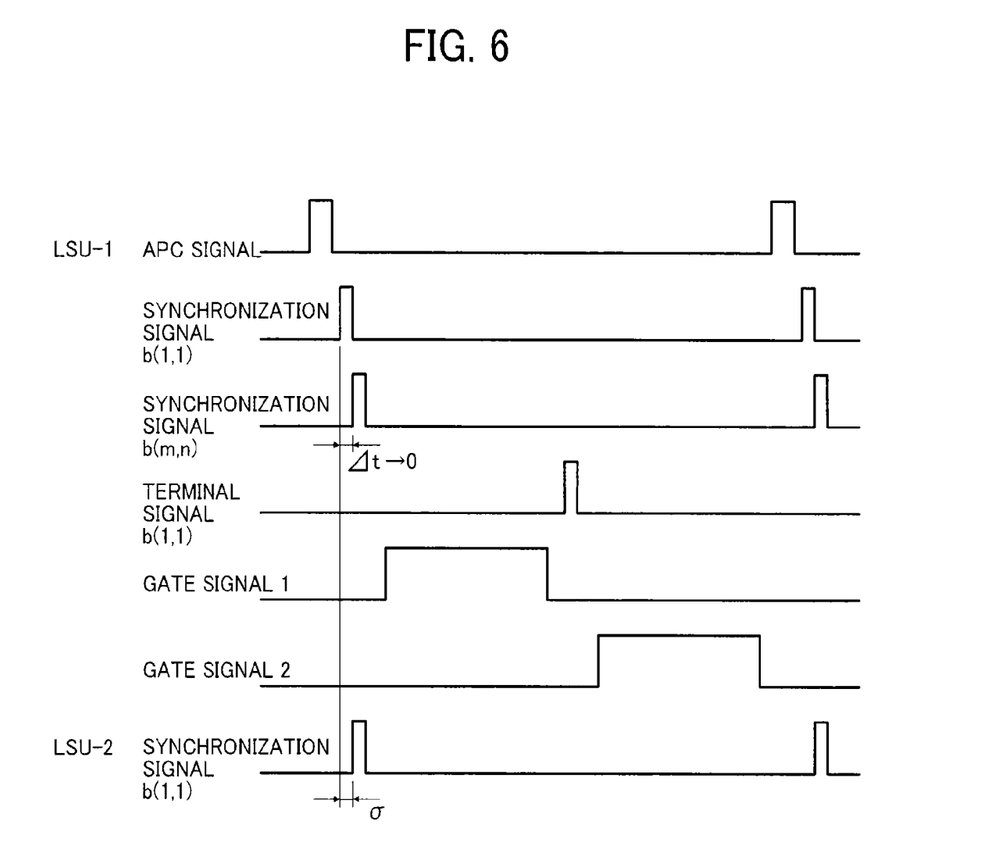
FIG. 6 is a timing chart of writing control.

FIG. 6 is a timing chart at writing control. The misalignment of the vertical cavity surface emitting semiconductor laser array 211 in the arrangement direction can be checked by, for example, detecting the generation timing of each synchronization detection signal of beam spots (1, 1) to (m, n) and adjusted in such a manner that the misalignment of the generation timing Δt is zero.

Gate signal 1 and Gate signal 2 represent writing timing for image recording by each station.

On the other hand, as described, in this embodiment, the optical scanning device is divided into two units each of which has two stations.

In FIG. 6, δ represents a phase control of the two polygon scanners in each unit. The scanning position is shifted by controlling the rotation phase of the polygon scanners between the units to align the writing starting position of each in the sub-scanning direction.

As illustrated in FIG. 7, polygon scanners 401 and 402 typically have rotating bodies of rotor magnets in which south poles and north poles are arranged in the circumferential direction while equally divided. Every time the boundary between the south pole and the north pole passes over hole elements arranged on the circuit board, rotation position detection signals having a constant cycle are generated to control the rotation speed.

The polygon scanners rotate when a pulse signal f0 having a constant frequency is input from outside according to the number of rotation. By inputting this pulse signal and the rotation position detection signal described above into a phase locked-loop (PLL), a driving frequency fd in which the phase is controlled such that the rotation position detection signal is generated at a constant cycle is generated to rotate the polygon mirror at a constant speed.

The pulse signal f0 having the same frequency is input into each polygon scanner so that the rotation speed of each polygon mirror is equal.

On the other hand, the beams of light deflected by the polygon mirror are detected by the synchronization detection sensor 123 serving as a synchronization detector (detection sensor) at the starting end of each scanning and the synchronization detection signals are generated for each surface (plane).

In this embodiment, the synchronization detection sensors are arranged at the same image height and the number of poles is determined such that the number of surfaces of the polygon mirror is equal to the number of pulses of the rotation position detection signal corresponding to one rotation. By inputting the phase difference of the other synchronization detection signals based on the polygon mirror 106 into the adder and controlling the phase of the driving frequency fd output from the PLL, the rotation phase of the polygon mirror is controlled such that the detection timing σ of the synchronization detection signal between the units is equal to a predetermined value.

The rotation phase σ is obtained from the following relationship where the amount of shift of the scanning position is d (mm), the moving speed of the intermediate transfer belt is v (mm/s), and the scanning frequency of the polygon scanner is f (Hz):

$$\sigma = d/v - k/f$$

where k is an integer equal to or greater than σ.

As described above, an inexpensive and small optical scanning device that produces high definition images free from uneven image density while the deviation of the amount of beams of light from each light source on the scanned surface is small can be provided by having the multi-beam light source device, the deflector that scans the beams of light from the multi-beam light source, and the image focusing optical system to focus the scanned beams of light on the scanned surface.

In addition, to alternately scan multiple image bearing drums with the beams of light from the multi-beam light source chronologically per scanning by the deflector, the vertical cavity surface emitting laser device is alternately driven chronologically according to the image data corresponding to the multiple image bearing drums. Therefore, images can be written on the multiple image bearing drums simultaneously by the single multi-beam light source so that the space occupied by the light source unit is halved, resulting in size reduction of the optical scanning device.

FIG. 8 is a diagram illustrating an image forming apparatus on which the optical scanning device described above is mounted.

The image forming apparatus is described taking the fourth image forming station that forms latent images according to the black image information as a representative example. Around the image bearing drum 104, there are provided a charger 902 that applies a high voltage to the image bearing drum 104, a development device 904 having a development roller 903 to attach charged toner to a latent electrostatic image recorded by an optical scanning device 900B to obtain a visual image, and a cleaner 905 to remove toner remaining on the image bearing drum 104 after the visual image is transferred to the intermediate transfer belt 105.

As describe above, multiple lines are recorded on the image bearing drum 104 by scanning of a single plane of the polygon mirror.

As described above, the image forming station is arranged along the moving direction of the intermediate transfer belt 105 and toner images of yellow, magenta, cyan, and black are synchronously transferred to and superimposed on the intermediate transfer belt 105 to obtain a color image.

Each image forming station has the same configuration except for the color of toner.

A recording paper S as a recording medium is supplied from a paper tray 907 by a feeding roller 908 and sent out by a pair of registration rollers 909 to the timing of starting recording in the sub-scanning direction. The color image on the intermediate transfer belt is transferred by a secondary transfer roller 920 serving as the secondary transfer device, fixed by a fixing device 910, and discharged to a discharging tray 911 by a pair of discharging rollers 912.

What is claimed is:

1. A multi-beam light source device comprising:
    a vertical cavity surface emitting laser device having monolithically fabricated multiple light sources;
    an optical sensor to monitor an output of beams of light emitted from the vertical cavity surface emitting laser device;
    a printed circuit board on which a driving circuit is formed to drive the vertical cavity surface emitting laser device based on monitoring signals from the optical sensor;
    a coupling lens to change the beams of light emitted from the vertical cavity surface emitting laser device to a predetermined state;
    a transparent board on which a wiring pattern is formed to wire an electrode of the vertical cavity surface emitting laser device and a terminal of the driving circuit; and a holding unit to integrally hold the vertical cavity surface emitting laser device, the optical sensor, the printed circuit board, the coupling lens, and the transparent board, wherein the vertical cavity surface emitting laser device is mounted to the transparent board with an emitting surface of the vertical cavity surface emitting laser device in contact with a surface of the transparent board on which the wiring pattern is formed, the transparent board is mounted on the printed circuit board with the surface on which the wiring pattern of the transparent board is formed in contact with the printed circuit board, and the printed circuit board is supported by the holding unit with a surface of the printed circuit board on which the transparent board is mounted pressed against and supported by a mounting surface formed on the holding unit which is orthogonal to an optical axis of the coupling lens, wherein the optical sensor is mounted on the transparent board with a light-receiving surface of the optical sensor in direct contact with the surface of the transparent board on which the wiring pattern is formed.

2. The multi-beam light source device according to claim 1, wherein the holding unit includes a positioning device to determine a position of the printed circuit board in a direction orthogonal to an arrangement direction of the vertical cavity surface emitting laser device and the optical sensor on the mounting surface.

3. The multi-beam light source device according to claim 1, wherein the holding unit includes a light path splitting member to split the beams of light from the vertical cavity surface emitting laser device and reflect one of the split beams of light onto the optical sensor.

4. The multi-beam light source device according to claim 3, wherein the light path splitting member is adjustable along the optical axis of the coupling lens.

5. The multi-beam light source device according to claim 1, further comprising:

an aperture to limit the beams of light from the coupling lens, wherein an aspect ratio of the aperture is substantially equal to that of an opening in the light-receiving surface of the optical sensor.

6. The multi-beam light source device according to claim 5, wherein a width of the opening in the light-receiving surface of the optical sensor is regulated by the wiring pattern.

7. An optical scanning device comprising:

the multi-beam light source device of claim 1;

a deflector to scan the beams of light from the multi-beam light source device; and an image focusing optical system to focus images on a surface scanned by the beams of light.

8. The optical scanning device according to claim 7, wherein multiple image bearing members are alternately scanned by the beams of light from the multi-beam light source device in chronological order based on a single scan by the deflector.

9. An image forming apparatus comprising:

the optical scanning device of claim 7.

* * * * *